Figures 1, 2, 3:
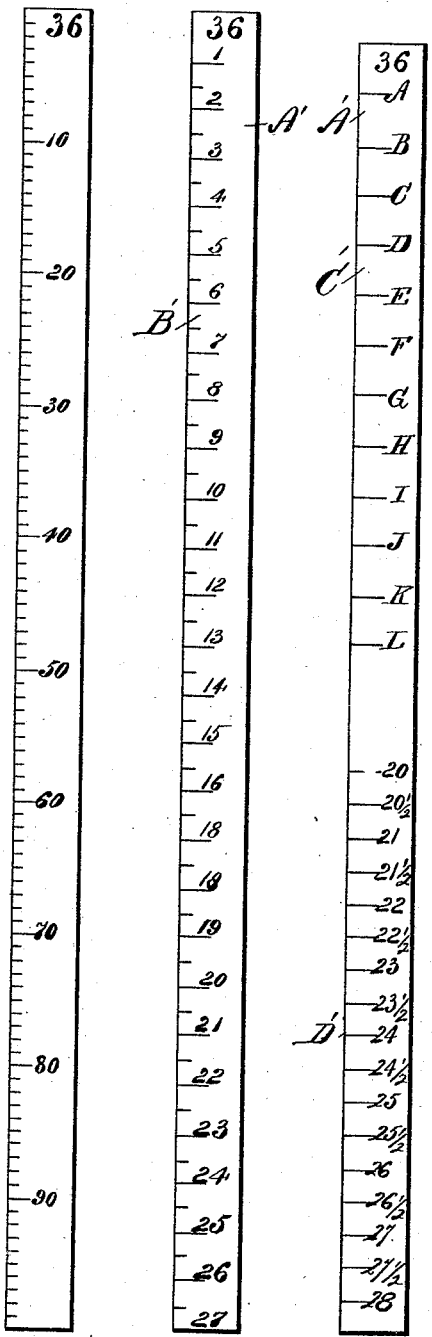

(No Model.)

M. E. KELLOGG.
TAILOR'S MEASURE.

No. 435,182. Patented Aug. 26, 1890.

WITNESSES
Samuel E. Thomas.
M. E. Hunt.

INVENTOR
Martha E. Kellogg,
by Charles J. Hunt
her Attorney.

UNITED STATES PATENT OFFICE.

MARTHA E. KELLOGG, OF BATTLE CREEK, MICHIGAN.

TAILOR'S MEASURE.

SPECIFICATION forming part of Letters Patent No. 435,182, dated August 26, 1890.

Application filed December 28, 1889. Serial No. 335,292. (No model.)

*To all whom it may concern:*

Be it known that I, MARTHA E. KELLOGG, a citizen of the United States, and a resident of Battle Creek, in the county of Calhoun and State of Michigan, have invented new and useful Improvements in Tailors' Measures; and I do hereby declare that the following is a full, clear, and exact description thereof, reference being had to the accompanying drawings, which form a part of this specfication.

My invention relates to that class of measures and scales for drafting garments which are used in laying out the patterns for ladies' dresses.

The object of my invention is to provide a set of scales and a curved rule whereby, after the measurement of the bust and waist has been obtained by a tape-line, the ladies' garments can be designed and cut with as much certainty of fitting the form as any tailor-made gentleman's dress; and it consists in a set of scales founded upon the bust and waist measurements of a lady and the relation of one to the other and their relation to the other parts of the form.

Figure 1 is a scale of a bust-measurement divided into one hundred equal parts. Fig. 2 is a front view of the rule, showing the scale of the bust-measurement. Fig. 3 is the reverse view of the rule, showing the scale from the bust-measurement in connection with the scale from the waist-measurement.

In laying out the diagrams the ordinary tailor's square is used with the rules and scales of my invention. This ordinary square is provided with a curve on its inner angle, being the arc of 90° of a circle of a radius of about two and three-eighths inches.

In the drawings, A' represents the rule upon which the scales are projected. In forming these scales a lady's bust-measurement is taken as a base and divided into one hundred equal parts.

B' is a scale of one-fourth of the bust-measurement, showing twenty-five of the hundred parts, with two additional parts, making twenty-seven in all. The two additional parts are added to give sufficient fullness to the dress.

C' is the scale on the reverse of the rule. At its upper end the parts in this scale are the hundredth part of the bust-measurement, and are designated by letters instead of numbers.

D' is a scale of one-quarter of the waist-measurement divided into quarter-inches. This scale commences at the third division or at the line marked "C" on the upper scale, because the first three parts are taken off the bust-measurement to bring it down to the waist-measurement. Then the sum in inches of the width of the darts cut in the patterns of the half of the front of the dress is subtracted from the quarter of the waist-measurement and the remainder, divided into quarter-inches, is projected as a scale on the lower part of the rule. This scale is in reality numbered from one upward, commencing at the division C on the upper scale; but the parts and the lower numbers are omitted, because the ratio of the waist-measure to the bust-measure is such that a waist of the size indicated by the lower number could not be conceived of in connection with the bust-measurement, which may be the foundation of any given set of scales.

What I claim as my invention is—

A rule for designing ladies' garments, having delineated on it at one extremity a scale of parts each equal to the one-hundredth part of any given bust-measurement, and at the other extremity a scale of quarter-inches so connected with the scale from the bust-measurement that the quarter-inch scale shall begin at the end of the third part on the scale from the bust-measurement, the lower divisions and their numbers being omitted on the rule, all substantially as described and shown.

MARTHA E. KELLOGG.

Witnesses:
FRANCIS R. BOSELLY,
ARTHUR ROBINSON.